(12) United States Patent
Shimizu et al.

(10) Patent No.: US 8,539,850 B2
(45) Date of Patent: Sep. 24, 2013

(54) POWER TRANSMISSION DEVICE AND VEHICLE HAVING THE SAME

(75) Inventors: Tetsuya Shimizu, Anjo (JP); Kazuhiko Kato, Kariya (JP); Kenichi Tsuchida, Hazu-gun (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 221 days.

(21) Appl. No.: 13/121,264

(22) PCT Filed: Dec. 16, 2009

(86) PCT No.: PCT/JP2009/071359
§ 371 (c)(1),
(2), (4) Date: Mar. 28, 2011

(87) PCT Pub. No.: WO2010/074100
PCT Pub. Date: Jul. 1, 2010

(65) Prior Publication Data
US 2011/0174107 A1      Jul. 21, 2011

(30) Foreign Application Priority Data

Dec. 25, 2008  (JP) .................................. 2008-330085
Oct. 7, 2009   (JP) .................................. 2009-233528

(51) Int. Cl.
*B60K 3/00* (2006.01)
(52) U.S. Cl.
USPC ............. 74/473.11; 475/12; 475/28; 475/206
(58) Field of Classification Search
USPC .......................................... 74/473.1, 473.11
See application file for complete search history.

(56) References Cited

U.S. PATENT DOCUMENTS

| 3,886,810 | A  | * | 6/1975 | Sugiyama et al. | ............. | 477/41 |
| 5,951,429 | A  | * | 9/1999 | Eastman | ........................ | 475/204 |
| 6,929,584 | B2 | * | 8/2005 | Miyata et al. | .................. | 477/119 |
| 7,894,969 | B2 | * | 2/2011 | Asami et al. | ..................... | 701/84 |

(Continued)

FOREIGN PATENT DOCUMENTS

| DE | 10 2006 034 091 A1 | 1/2008 |
| JP | A-2004-69016 | 3/2004 |
| JP | A-2008-180303 | 8/2008 |
| WO | WO 2007/046509 A2 | 4/2007 |

OTHER PUBLICATIONS

International Search Report for International Patent Application No. PCT/JP2009/071359, mailed on Mar. 11, 2010.

(Continued)

*Primary Examiner* — David M Fenstermacher
*Assistant Examiner* — Zakaria Elahmadi
(74) *Attorney, Agent, or Firm* — Oliff & Berridge, PLC

(57) ABSTRACT

A manual valve is formed with a drain input port that closes if a shift is made to the D position, and opens for draining if a shift is made to the N position. A switching valve communicates an output port of a pressure regulating valve portion and an oil passage of a clutch and closes a drain port during engine operation when a line pressure is applied, and cuts off communication between the output port of the pressure regulating valve portion and the oil passage of the clutch and communicates the oil passage with the drain port during an engine automatic stop when the line pressure is not applied. The drain input port and the drain port are connected by a drain oil passage.

7 Claims, 6 Drawing Sheets

(56) References Cited

U.S. PATENT DOCUMENTS

| | | | |
|---|---|---|---|
| 8,200,383 B2* | 6/2012 | Heap | 701/22 |
| 2002/0091034 A1* | 7/2002 | Nakamori et al. | 477/3 |
| 2003/0109970 A1* | 6/2003 | Nakamori et al. | 701/22 |
| 2004/0026155 A1 | 2/2004 | Miyata et al. | |
| 2004/0043863 A1* | 3/2004 | Kondo et al. | 477/38 |
| 2004/0192484 A1* | 9/2004 | Watanabe et al. | 475/116 |
| 2007/0105681 A1* | 5/2007 | Bucher et al. | 475/116 |
| 2007/0169753 A1* | 7/2007 | Sato et al. | 123/467 |
| 2007/0179004 A1* | 8/2007 | Endo | 475/116 |
| 2007/0281817 A1* | 12/2007 | Sato | 475/116 |
| 2008/0176700 A1* | 7/2008 | Long et al. | 475/116 |
| 2009/0036248 A1* | 2/2009 | Mueller et al. | 475/72 |
| 2011/0213533 A1* | 9/2011 | Ueoka et al. | 701/66 |

OTHER PUBLICATIONS

Written Opinion for International Patent Application No. PCT/JP2009/071359, mailed on Mar. 11, 2010.

Aug. 7, 2012 Partial Translation of Notification of Reason(s) for Refusal issued in Japanese Patent Application No. 2009-233528.

* cited by examiner

FIG.3

|   |   | C1 | C2 | C3 | B1 | B2 | B3 | B4 | F1 | F2 | F3 |
|---|---|---|---|---|---|---|---|---|---|---|---|
|   | P |   |   |   |   |   |   |   |   |   |   |
|   | R |   |   | ○ | (○) |   |   | ○ | ○ |   |   |
|   | N |   |   |   |   |   |   |   |   |   |   |
| D | 1st | ○ |   |   |   |   |   | (○) |   |   | ○ |
| D | 2nd | ○ |   |   |   | (○) | ○ |   | ○ | ○ |   |
| D | 3rd | ○ |   | ○ | (○) |   | ● |   | ○ |   |   |
| D | 4th | ○ | ○ | ● |   |   | ● |   |   |   |   |
| D | 5th |   | ○ | ○ | ○ |   | ● |   |   |   |   |

(○) : ENGINE BRAKE IN OPERATION
● : ENGAGED BUT NO TORQUE TRANSMITTED

D POSITION

N POSITION

POWER TRANSMISSION DEVICE AND VEHICLE HAVING THE SAME

INCORPORATION BY REFERENCE

The disclosures of Japanese Patent Application Nos. 2009-233528 and 2008-330085 filed on Oct. 7, 2009 and Dec. 25, 2008, respectively, including the specification, drawings and abstract are incorporated herein by reference in their entirety.

BACKGROUND OF THE INVENTION

The present invention relates to a power transmission device and a vehicle having the power transmission device. More specifically, the present invention relates to a power transmission device that is installed in a vehicle and transmits power from a motor to an axle through a friction engagement element, and a vehicle having the power transmission device.

DESCRIPTION OF THE RELATED ART

According to related art, this type of power transmission device conventionally has a hydraulic pump that drives based on power from an engine; a manual shift valve that operates in association with a shift operation; a solenoid valve whose input port is connected to the hydraulic pump through the manual shift valve; a selector valve that is formed as a two-position electromagnetic valve (and includes a check valve), wherein at a first position the selector valve communicates with an oil passage that is interposed between and connects an output port of the solenoid valve to a friction engaging device (clutch) and at a second position the selector valve cuts off this oil passage; and an electromagnetic pump that directly delivers discharge pressure to the clutch. (See Japanese Patent Application Publication No. JP-A-2008-180303 for an example.)

In the power transmission device described above, if some abnormality (such as the penetration of foreign matter) causes the selector valve to stick while the selector valve has cut off the connection between the output port of the solenoid valve and the clutch, hydraulic pressure acting on the clutch may become trapped. In general hydraulic pressure from the hydraulic pump is not delivered to the clutch because hydraulic pressure from the hydraulic pump is cut off by the manual shift valve when shifting is performed to the neutral position. In the case described above, even if the manual shift valve cuts off hydraulic pressure from the hydraulic pump as a result of shifting performed to the neutral position, the clutch remains engaged due to residual pressure and unexpected power from the engine may be transmitted to the axle.

SUMMARY OF THE INVENTION

The present invention provides a power transmission device that suppresses the transmission of unexpected power from a motor to an axle upon a shift operation to a neutral position even when an abnormality occurs in a selector valve that supplies and cuts off fluid pressure to a clutch, and a vehicle having the same.

The power transmission device and the vehicle having the same of the present invention employ the following to achieve the above.

A power transmission device according to a first aspect of the present invention is installed in a vehicle. The power transmission device includes: a friction engagement element that transmits power from a motor to an axle; a mechanical pump that is driven by power from the motor and generates fluid pressure; a switching valve that is connected to a supply path connected to a fluid pressure servo of the friction engagement element, and switches between opening and closing the supply path; a shift valve that outputs fluid pressure generated by the mechanical pump to the supply path if a shift is made to a driving position, and drains operation fluid in the fluid pressure servo if a shift is made to a neutral position when the switching valve is locked in a state that closes the supply path; and an electric pump that is driven by electric power, and generates and supplies fluid pressure to the fluid pressure servo when the switching valve closes the supply path.

According to the power transmission device of the first aspect, when a shift is made to the driving position, the shift valve outputs fluid pressure generated by the mechanical pump to the supply path that is connected to the fluid pressure servo of the friction engagement element. The shift valve also drains operation fluid in the fluid pressure servo if a shift is made to the neutral position while the switching valve, which switches between opening and closing the supply path, is locked in a state that closes the supply path. Thus, even if the switching valve is locked in a state that closes the supply path due to some abnormality, the transmission of power unexpected by the driver from the motor to the axle can be surely suppressed. When the switching valve is operating normally, the electric pump can be driven while the mechanical pump is stopped in connection with stopping of the motor so that fluid pressure is applied to the fluid pressure servo of the friction engagement element. Therefore, when the motor subsequently restarts, the friction engagement element can be rapidly engaged and power transmission quickly initiated. Here, in addition to including an internal combustion engine that automatically stops and automatically starts, the term "motor" also includes an electric motor. In addition to including a clutch that connects two rotating systems, the term "friction engagement element" also includes a brake that connects one rotating system to a fixing system such as a case. The term "electric pump" includes an ordinary electric pump that is driven by power from an electric motor to generate fluid pressure, as well as an electromagnetic pump or the like that generates fluid pressure by reciprocating a mobile part using electromagnetic force or the biasing force of a spring.

In the power transmission device according to the first aspect, the shift valve may include: an input port; a plurality of output ports including a driving position output port; and a drain input port that is connected to a drain passage connected to the fluid pressure servo and is input with the operation fluid from the drain passage, wherein if a shift is made to the driving position, fluid pressure generated by the mechanical pump is input from the input port and output from the driving position output port and the drain input port is closed, and if a shift is made to the neutral position, communication between the input port and the driving position output port is cut off and the drain input port is opened to drain the operation fluid.

In the above structure, the drain passage may be connected to the fluid pressure servo through the switching valve. The switching valve may include: a signal pressure port that is connected to a flow passage from the mechanical pump; an input port that is connected to a flow passage from the driving position output port; an output port that is connected to a flow passage from the fluid pressure servo; and a drain port that is connected to the drain passage, wherein the switching valve communicates the input port with the output port and closes the drain port when fluid pressure acts on the signal pressure port, and closes the input port and communicates the output port with the drain port when fluid pressure does not act on the signal pressure port.

The electric pump may be an electromagnetic pump. The electric pump may also include: a pressure regulating valve that is input with and regulates fluid pressure from the driving position output port and supplies the fluid pressure to the fluid pressure servo through the switching valve, wherein the pressure regulating valve and the electromagnetic pump are integrated in a solenoid valve. The solenoid valve may include: a hollow sleeve that has a first port group that includes an input port, an output port, and a drain port, and a second port group that includes an intake port and a discharge port; a spool that is a shaft accommodated in the sleeve, and opens and closes the respective ports by sliding in the axial direction; a spring that biases the spool in the axial direction; a solenoid portion that generates thrust acting on the spool in a direction that opposes the spring; a pressure regulating chamber formed between the sleeve and the spool so as to function as the pressure regulating valve that, by adjusting the thrust generated by the solenoid portion, regulates a pressure of operation fluid input through the input port by discharge from the drain port, and outputs the operation fluid from the output port; and a pump chamber that is defined as a space between the sleeve and the spool and is separated from the pressure regulating chamber so as to function as the electromagnetic pump that, by repeated generation and cancellation of the thrust from the solenoid portion, intakes operation fluid through the intake port and discharges operation fluid from the discharge port. Consequently, a more downsized device can be achieved compared to one that separately provides a pressure regulating valve and an electromagnetic pump.

A vehicle according to a second aspect of the present invention includes a motor, and the power transmission device according to the first aspect described above. The power transmission device is installed in a vehicle. The power transmission device also includes: a friction engagement element that transmits power from a motor to an axle; a mechanical pump that is driven by power from the motor and generates fluid pressure; a switching valve that is connected to a supply path connected to a fluid pressure servo of the friction engagement element, and switches between opening and closing the supply path; a shift valve that outputs fluid pressure generated by the mechanical pump to the supply path if a shift is made to a driving position, and drains operation fluid in the fluid pressure servo if a shift is made to a neutral position when the switching valve is locked in a state that closes the supply path; and an electric pump that is driven by electric power, and generates and supplies fluid pressure to the fluid pressure servo when the switching valve closes the supply path.

According to the second aspect of the present invention, the vehicle is installed with the power transmission device according to the first aspect of the present invention described above. Therefore, effects achieved by the power transmission of the present invention, for example, an effect of more surely suppressing a transmission of power unexpected by the driver to the axle after shifting to the neutral position, can be achieved by the vehicle of the present invention.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 3 is an explanatory drawing that shows an operation chart of the automatic transmission 30;

DETAILED DESCRIPTION OF THE EMBODIMENTS

Next, an embodiment of the present invention will be described.

Figure 1:
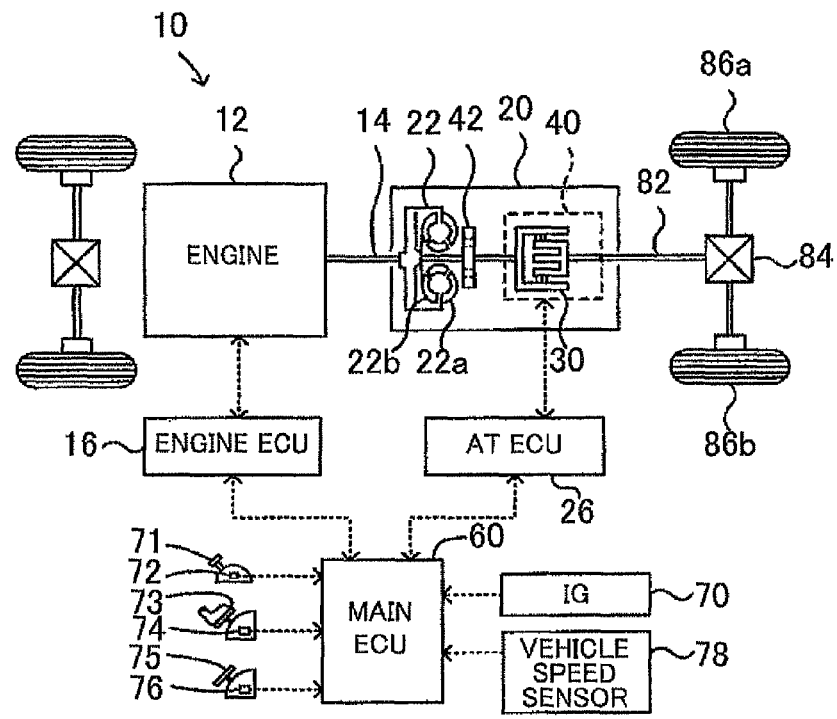
FIG. 1 is a structural diagram that shows an outline of the constitution of an automobile 10 incorporated with a power transmission device 20 serving as an embodiment of the present invention.
Figure 2:
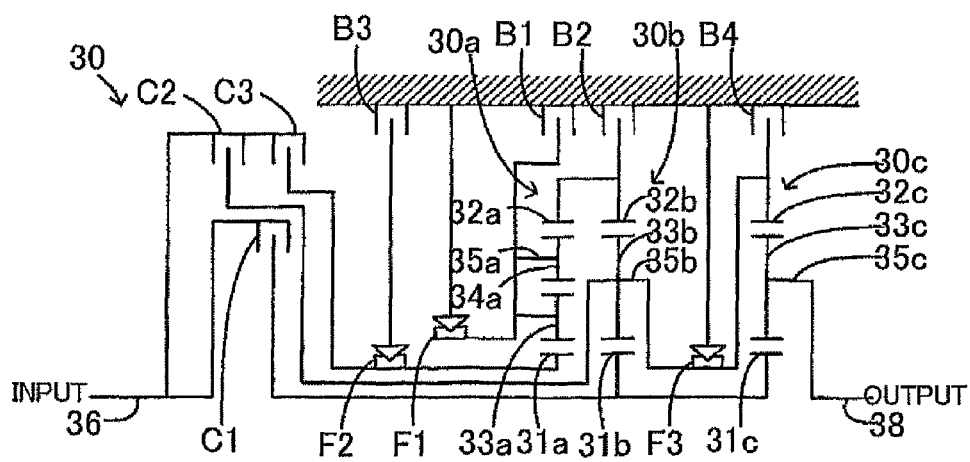
FIG. 2 is a structural diagram that shows an outline of the constitution of an automatic transmission 30 provided in the power transmission device 20 of the embodiment.

FIG. 1 is a structural diagram that shows an outline of the constitution of an automobile 10 incorporated with a power transmission device 20 serving as an embodiment of the present invention. FIG. 2 is a structural diagram that shows an outline of the constitution of an automatic transmission 30 provided in the power transmission device 20 of the embodiment. FIG. 3 is an explanatory drawing that shows an operation chart of the automatic transmission 30.

As FIG. 1 shows, the vehicle 10 of the present embodiment includes an engine 12, an engine electronic control unit (engine ECU) 16, and a power transmission device 20. The engine 12 is an internal combustion engine that outputs power by explosive combustion of a hydrocarbon fuel such as gasoline or diesel. The engine ECU 16 operates and controls the engine 12. The power transmission device 20 of the embodiment is connected to a crankshaft 14 of the engine 12, as well as to a drive shaft 82 connected to right and left wheels 86a, 86b through a differential gear 84, and transmits power from the engine 12 to the drive shaft 82.

The power transmission device 20 of the embodiment is formed as a transaxle device that transmits power from the engine 12 to the drive shaft 82, and includes a torque converter 22, a mechanical oil pump 42, the automatic transmission 30, a hydraulic circuit 40, an automatic transmission electronic control unit (AT ECU) 26, and a main electronic control unit 60. The torque converter 22 has a lock-up clutch and is formed from an input side pump impeller 22a that is connected to the crankshaft 14 of the engine 12, and an output side turbine runner 22b. The mechanical oil pump 42 is disposed downstream of the torque converter 22 and pressure feeds operation oil based on the power from the engine 12. The automatic transmission 30 is staged and driven by hydraulic pressure. In addition, the automatic transmission 30 has the input shaft 36 connected to the turbine runner 22b side of the torque converter 22 and an output shaft 38 that is connected to the drive shaft 82. The automatic transmission changes the speed of power input to the input shaft 36, which it then outputs to the output shaft 38. The hydraulic circuit 40 is an actuator that drives the automatic transmission 30. The AT ECU 26 controls the automatic transmission 30 (hydraulic circuit 40). The main electronic control unit 60 controls the vehicle overall. Note that the main electronic control unit 60 is input with an ignition signal from an ignition sensor 70; a shift position SP from a shift position sensor 72 that detects an operation position of a shift lever 71; an accelerator opening Acc from an accelerator pedal position sensor 74 that detects a depression amount of an accelerator pedal 73; a brake switch signal BSW from a brake switch 76 that detects depression of a brake pedal 75; and a vehicle speed V from a vehicle speed sensor 78. The main electronic control unit 60 is also connected to the engine ECU 16 and the AT ECU 26 through communication ports, and exchanges various control signals and data with the engine ECU 16 and the AT ECU 26.

As shown in FIG. 2, the automatic transmission 30 has a double-pinion type planetary gear mechanism 30a; two single-pinion type planetary gear mechanisms 30b, 30c; three clutches C1, C2, C3; four brakes B1, B2, B3, B4; and three one-way clutches F1, F2, F3. The double-pinion type planetary gear mechanism 30a has a sun gear 31a with external teeth; a ring gear 32a with internal teeth that is disposed concentrically with respect to the sun gear 31a; a plurality of first pinion gears 33a that mesh with the sun gear 31a; a plurality of second pinion gears 34a that mesh with the plurality of first pinion gears 33a and also mesh with the ring gear 32a; and a carrier 35a that is connected to and also rotatably and revolvably holds the plurality of first pinion gears 33a and the plurality of second pinion gears 34a. The sun gear 31a is connected to the input shaft 36 through the clutch C3. The sun gear 31a is also connected to the brake B3 through the one-way clutch F2, and the rotation of the sun gear 31a is permitted or held stationary by engaging and disengaging the brake B3. The rotation of the ring gear 32a is permitted or held stationary by engaging and disengaging the brake B2. The carrier 35a is restricted to rotation in one direction by the one-way clutch F1, and the rotation of the carrier 35a is permitted or held stationary by engaging and disengaging the brake B1. The single-pinion type planetary gear mechanism 30b has a sun gear 31b with external teeth; a ring gear 32b with internal teeth that is disposed concentrically with respect to the sun gear 31b; a plurality of pinion gears 33b that mesh with the sun gear 31b and the ring gear 32b; and a carrier 35b that rotatably and revolvably holds the plurality of pinion gears 33b. The sun gear 31b is connected to the input shaft 36 through the clutch C1. The ring gear 32b is connected to the ring gear 32a of the double-pinion type planetary gear mechanism 30a, and the rotation of the ring gear 32b is permitted or held stationary by engaging and disengaging the brake B2. The carrier 35b is connected to the input shaft 36 through the clutch C2, and the carrier 35b is restricted to rotation in one direction by the one-way clutch F3. The single-pinion type planetary gear mechanism 30c has a sun gear 31c with external teeth; a ring gear 32c with internal teeth that is disposed concentrically with respect to the sun gear 31c; a plurality of pinion gears 33c that mesh with the sun gear 31e and the ring gear 32c; and a carrier 35c that rotatably and revolvably holds the plurality of pinion gears 33c. The sun gear 31c is connected to the sun gear 31b of the single-pinion type planetary gear mechanism 30b. The ring gear 32c is connected to the carrier 35b of the single-pinion type planetary gear mechanism 30b, and the rotation of the ring gear 32c is permitted or held stationary by engaging and disengaging the brake B4. The carrier 35c is connected to the output shaft 38.

As shown in FIG. 3, the automatic transmission 30 can switch among first to fifth forward speeds, one reverse speed, and neutral by engaging and disengaging the clutches C1 to C3 and the brakes B1 to B4. The first forward speed, namely the state of decelerating the rotation of the input shaft 36 at the largest reduction ratio and transmitting such rotation to the output shaft 38, is formed by engaging the clutch C1, and disengaging the clutches C2, C3 and the brakes B1 to B4. In the first forward speed, the brake B4 is engaged during engine braking. The second forward speed is formed by engaging the clutch C1 and the brake B3, and disengaging the clutches C2, C3 and the brakes B1, B2, B4. In the second forward speed, the brake B2 is engaged during engine braking. The third forward speed is formed by engaging the clutches C1, C3 and the brake B3, and disengaging the clutch C2 and the brakes B1, B2, B4. In the third forward speed, the brake B1 is engaged during engine braking. The fourth forward speed is formed by engaging the clutches C1 to C3 and the brake B3, and disengaging the brakes B1, B2, B4. The fifth forward speed, namely the state of decelerating (accelerating) the rotation of the input shaft 36 at the smallest reduction ratio and transmitting such rotation to the output shaft 38, is formed by engaging the clutches C2, C3 and the brakes B1, B3, and disengaging the clutch C1 and the brakes B2, B4. Neutral in the automatic transmission 30, namely the state of uncoupling the input shaft 36 and the output shaft 38, is achieved by disengaging all the clutches C1 to C3 and the brakes B1 to B4. The reverse speed is formed by engaging the clutch C3 and the brake B4, and disengaging the clutches C1, C2 and the brakes B1 to B3.

Figure 4:
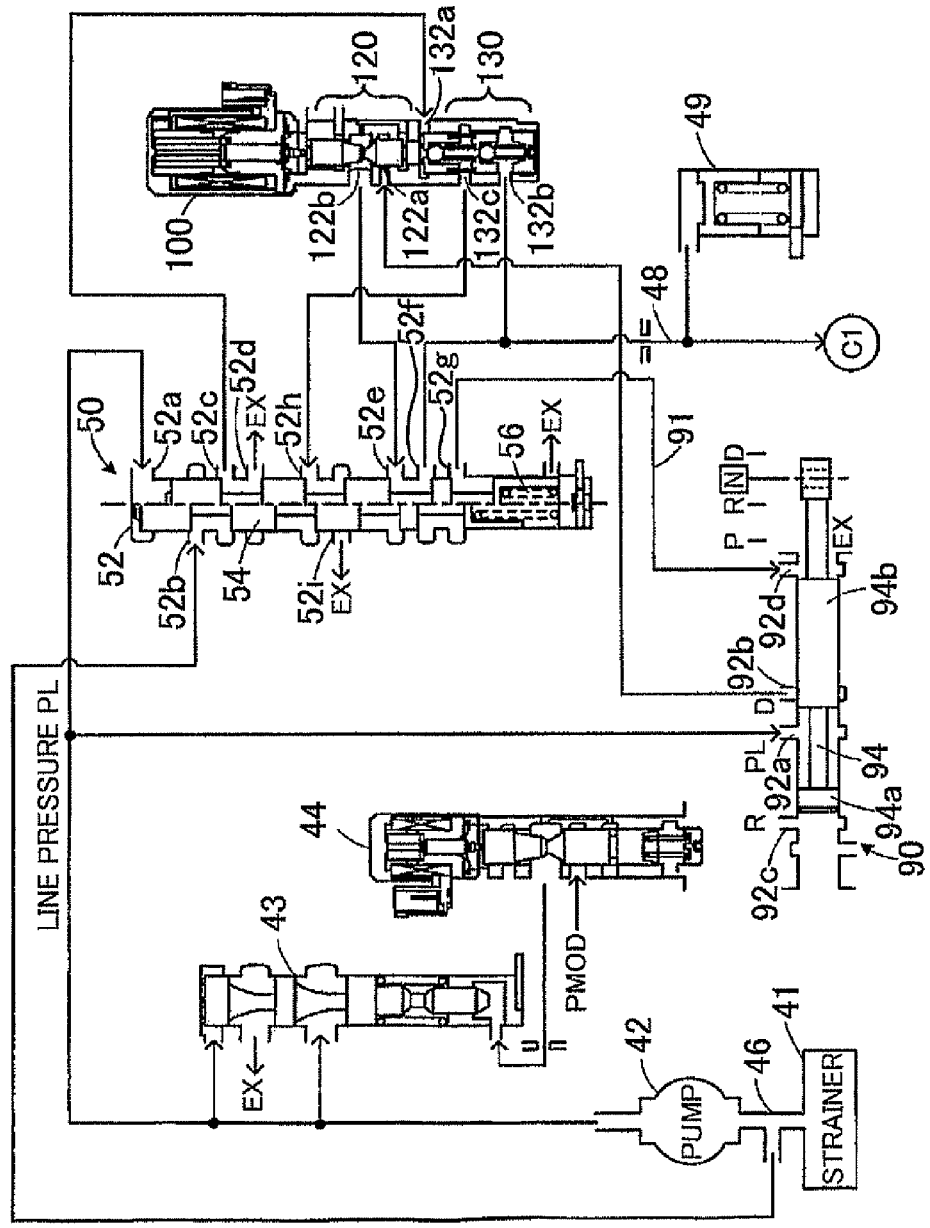
FIG. 4 is a structural diagram that shows an outline of the constitution of a hydraulic circuit 40.

Engaging and disengaging of the clutches C1 to C3 and the brakes B1 to B4 of the automatic transmission 30 is performed by the hydraulic circuit 40. FIG. 4 is a partial structural diagram that shows an outline of the constitution of a drive system of the clutch C1 in the hydraulic circuit 40. As shown in FIG. 4, the hydraulic circuit 40 includes: a regulator valve 43, a linear solenoid 44, a manual valve 90, a solenoid valve 100, a switching valve 50, and an accumulator 49. The regulator valve 43 regulates a pressure (line pressure PL) of operation oil pressure fed from the mechanical oil pump 42, which is driven by power from the engine 12, through a strainer 41. The linear solenoid 44 regulates a modulator pressure PMOD that is generated from the line pressure PL through a modulator valve (not shown) and outputs the modulator pressure PMOD as a signal pressure so as to drive the regulator valve 43. The manual valve 90 is formed with an input port 92a that is input with the line pressure PL, a Drive-position (D-position) output port 92b, and a Reverse-position (R-position) output port 92c, and the like. The manual valve 90 opens and closes each port in association with the operation of the shift lever 71. The solenoid valve 100 functions as a linear solenoid that is input with and regulates operation oil output from the D-position output port 92b of the manual valve 90, and outputs operation oil to the clutch C1. The solenoid valve 100 also functions as an electromagnetic pump that pressure feeds operation oil to the clutch C1. The switching valve 50 selectively switches between supplying the clutch C1 with operation oil from the solenoid valve 100 functioning as a linear solenoid and operation oil from the solenoid valve 100 functioning as an electromagnetic pump. The accumulator 49 is linked to an oil passage 48 that is connected to the clutch C1, and accumulates hydraulic pressure that acts on the clutch C1. Note that FIG. 4 only shows the hydraulic system of the clutch C1, and does not show the hydraulic systems for the other clutches C2, C3 or the brakes B1 to B4 because they are not central to the present invention. These hydraulic systems may be configured using common linear solenoids or the like. The solenoid valve 100 provided in the hydraulic circuit 40 will be described in further detail below.

Figure 5:
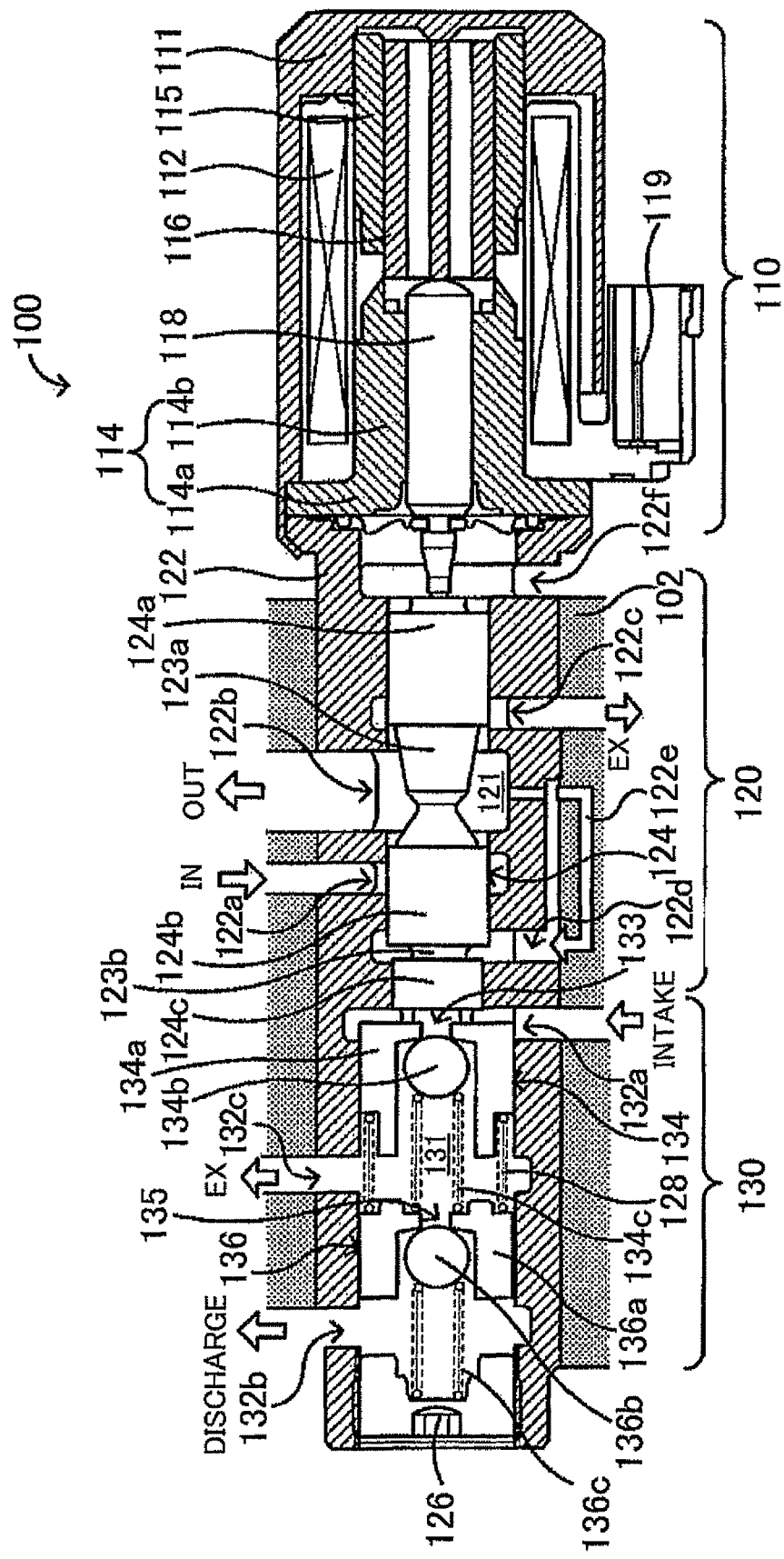
FIG. 5 is a structural diagram that shows an outline of the constitution of a solenoid valve 100.

FIG. 5 is a structural diagram that shows an outline of the constitution of the solenoid valve 100. The solenoid valve 100 is formed so as to function as a linear solenoid for direct control that is capable of directly controlling the clutch C1 by generating an optimal clutch pressure from the line pressure PL input through the manual valve 90, and function as an electromagnetic pump that generates hydraulic pressure. The solenoid valve 100 has a solenoid portion 110, a pressure regulating valve portion 120 that is driven by the solenoid portion 110, input with the line pressure PL, and regulates and outputs the input line pressure PL, and a pump portion 130 that is similarly driven by the solenoid portion 110 and pressure feeds operation oil.

The solenoid portion 110 includes: a case 111, a coil (solenoid coil) 112, a first core 114, a second core 115, a plunger 116, and a shaft 118. The case 111 is a bottomed cylindrical member. The coil 112 is disposed on the inner peripheral side of the case 111 and formed by winding an insulated electrical conductor around an insulative bobbin. The first core 114 is formed with a flange portion 114a whose flange outer peripheral portion is fixed to the opening end portion of the case 111, and also formed with a cylindrical portion 114b that extends in the axial direction along the inner peripheral face of the coil 112 from the flange portion 114a. The cylindrical second core 115 contacts the inner peripheral face of a recess portion formed on the bottom of the case 111, and extends in the axial direction along the inner peripheral face of the coil 112 up to a position that is separated from the cylindrical portion 114b of the first core 114 by a predetermined distance. The plunger 116 is accommodated in the second core 115, and can slide in the axial direction on the inner peripheral face of the first core 114 and the inner peripheral face of the second core 115. The shaft 118 is accommodated in the cylindrical portion 114b of the first core 114 while contacting the tip of the plunger 116, and can slide in the axial direction on the inner peripheral face of the cylindrical portion 114b. The solenoid portion 110 is arranged on a connector portion 119 with a terminal from the coil 112 formed on the outer peripheral portion of the case 111, and electricity is conducted to the coil 112 through this terminal. The case 111, the first core 114, the second core 115, and the plunger 116 are all formed by a ferromagnetic material such as highly pure iron or the like. A space between the end face of the cylindrical part 114b of the first core 114 and the end face of the second core 115 is formed to function as a non-magnetic body. It should be noted that this space may be provided as a non-magnetic metal such as stainless steel, brass, or the like so long as it functions as a non-magnetic body. In the solenoid portion 110, the conduction of electricity to the coil 112 forms a magnetic circuit in which magnetic flux circles around the coil 112 to the case 111, the second core 115, the plunger 116, the first core 114, and back to the case 111 in that order. Consequently, an attractive force acting between the first core 114 and the plunger 116 attracts the plunger 116. As described above, the tip of the plunger 116 contacts the shaft 118 that is slidable in the axial direction on the inner peripheral face of the first core 114. Therefore, the attractive force acting on the plunger 116 causes the shaft 118 to extrude forward (left in the figure).

The pressure regulating valve portion 120 and the pump portion 130 use the following members in common: a sleeve 122, a spool 124, an end plate 126, and a spring 128. The generally cylindrical sleeve 122 is incorporated into a valve body 102, with an end attached to the first core 114 by the case 111 of the solenoid portion 110. The spool 124 is accommodated in the interior space of the sleeve 122, with an end contacting the tip of the shaft 118 of the solenoid portion 110. The end plate 126 is threadedly fastened to another end of the sleeve 122. The spring 128 biases the spool 124 toward the solenoid portion 110 side.

The sleeve 122 is formed with an input port 122a, an output port 122b, a drain port 122c, and a feedback port 122d that are opening portions in an area forming the pressure regulating valve portion 120. The input port 122a is input with operation oil from the D-position output port 92b of the manual valve 90. The output port 122b discharges input operation oil to the clutch C1 side. The drain port 122c drains input operation oil. The feedback portion 122d is input with operation oil that is output from the output port 122b through an oil passage 122e, which is formed from the inner surface of the valve body 102 and the outer surface of the sleeve 122, and applies a feedback force to the spool 124. An end portion on the solenoid portion 110 side of the sleeve 122 is also formed with a discharge hole 122f for discharging operation oil that has leaked out from between the inner peripheral surface of the sleeve 122 and the outer peripheral surface of the spool 124 due to sliding of the spool 124. The sleeve 122 is further formed with an intake port 132a, a discharge port 132b, and a drain port 132c that are opening portions in an area forming the pump portion 130. The intake port 132a intakes operation oil, and the discharge port 132b discharges intaken operation oil. The drain port 132c discharges residual operation oil when the pump portion 130 stops functioning.

The spool 124 is formed as a shaft-like member accommodated inside the sleeve 122, and has three cylindrical lands 124a, 124b, 124c that can slide on the inner wall of the sleeve 122, a communication portion 123a, a connection portion 123b, an intake check valve 134 that is connected to the land 124c, and a discharge check valve 136 that is interposed between the intake check valve 134 and the end plate 126. The communication portion 123a connects the land 124a and the land 124b, and has a tapered shape such that the outer radius of the communication portion 123a is smaller than the outer radii of the lands 124a, 124b and the outer radius becomes smaller toward a center portion from both the lands 124a, 124b. In addition, the communication portion 123a enables communication between the input port 122a, the output port 122b and the drain port 122c. The connection portion 123b, together with the inner wall of the sleeve 122, forms a feedback chamber for applying the feedback force to the spool 124 in the direction of the solenoid portion 110 side. A pressure regulating chamber 121 is formed from the sleeve 122, the communication portion 123a of the spool 124, and the lands 124a, 124b. A pump chamber 131 is formed from the sleeve 122, and the intake and discharge check valves 134, 136 of the spool 124.

The intake check valve 134 of the pump portion 130 includes: a cylindrical body 134a that is connected to the land 124c and whose center is formed with an opening portion 133 that communicates with the pump chamber 131 and the intake port 132a; a ball 134b; and a spring 134c that presses the ball 134b against the opening portion 133 of the body 134a. When there is positive pressure inside the pump chamber 131, the biasing force of the spring 134c blocks the opening portion 133 to close the valve. When there is negative pressure inside the pump chamber 131, contraction of the spring 134c unblocks the opening portion 133 to open the valve. The discharge check valve 136 includes: a cylindrical body 136a that functions as a spring receiver that receives the spring 128 and the spring 134c of the intake check valve 134, and whose center is formed with an opening portion 135 that communicates with the discharge port 132b; a ball 136b; and a spring 136c that presses the ball 136b against the opening portion 135 of the body 136a with the end plate 126 acting as a spring receiver. When there is negative pressure inside the pump chamber 131, the biasing force of the spring 136c blocks the opening portion 135 to close the valve. When there is positive pressure inside the pump chamber 131, contraction of the spring 136c unblocks the opening portion 135 to open the valve. Therefore, when conduction to the coil 112 of the solenoid portion 110 is switched from on to off, the biasing force of the spring 136c and the spring 128 moves the spool 124 to the solenoid portion 110 side, which generates negative pressure inside the pump chamber 131 and causes the pump chamber 131 to intake operation oil from the intake port 132a through the discharge check valve 134. However, when conduction to the coil 112 of the solenoid portion 110 is switched from off to on, thrust from the solenoid portion 110 moves the spool 124 to the end plate 126 side, which generates positive pressure inside the pump chamber 131 and causes intaken operation oil to be discharged from the discharge port 132b through the discharge check valve 136.

Next, operations of the solenoid valve 100, namely an operation to function as a linear solenoid and an operation to function as an electromagnetic pump, will be described. The operation when functioning as a linear solenoid will be explained first. Here, a case where conduction to the coil 112 is switched off will be considered. In this case, because the spool 124 is moved to the solenoid portion 110 side by the biasing force of the springs 128, 134c, 136c, the land 124b blocks the input port 122a and the output port 122b communicates with the drain port 122c through the communication portion 123a. Therefore, no hydraulic pressure acts on the clutch C1. Once conduction to the coil 112 is switched on, the plunger 116 becomes attracted to the first core 114 by an attractive force corresponding to the magnitude of current applied to the coil 112, and the shaft 118 extrudes accordingly. The spool 124 that contacts the tip of the shaft 118 thus moves to the end plate 126 side. Consequently, the input port 122a, the output port 122b, and the drain port 122c communicate with one another, and operation oil input from the input port 122a is partially output to the output port 122b while the rest is output to the drain port 122c. Operation oil is also delivered to the feedback chamber through the feedback port 122d, and a feedback force corresponding to the output pressure of the output port 122b acts on the spool 124 in the direction of the solenoid portion 110 side. Consequently, the spool 124 is stopped at a position where the thrust (attractive force) of the plunger 116, the spring force of the spring 128, and the feedback force are exactly balanced. In such case, a larger current applied to the coil 112, that is, a greater thrust to the plunger 116, will cause the spool 124 to move farther to the end plate 126 side such that the opening surface area of the input port 122a widens and the opening surface area of the drain port 122c narrows. At maximum conduction to the coil 112, the spool 124 moves as far to the end plate 126 side as the mobile range of the plunger 116 allows, such that the communication portion 123a communicates the input port 122a with the output port 122b, and the land 124a blocks the drain port 122c and cuts off communication between the output port 122b and the drain port 122c. Therefore, the maximum hydraulic pressure acts on the clutch C1. As described above, it is clear that the solenoid valve 100 of the embodiment functions as a normally closed solenoid valve because when conduction to the coil 112 is switched off, the input port 122a is cut off and the output port 122b communicates with the drain port 122c.

The operation of the solenoid valve 100 when functioning as an electromagnetic pump will be explained next. Here, a case where conduction to the coil 112 is switched from on to off will be considered. In this case, the spool 124 moves from the end plate 126 side to the solenoid portion 110 side. Therefore, negative pressure is generated inside the pump chamber 131, and the intake check valve 134 opens and the discharge check valve 136 closes, such that the pump chamber 131 intakes operation oil from the intake port 132a through the intake check valve 134. Once conduction to the coil 112 is switched on from this state, the spool 124 moves from the solenoid portion 110 side to the end plate 126 side. Therefore, positive pressure is generated inside the pump chamber 131, and the intake check valve 134 closes and the discharge check valve 136 opens, such that operation oil intaken by the pump chamber 131 is discharged from the discharge port 132b through the discharge check valve 136. Thus, application of a square wave current that repeatedly switches conduction to the coil 112 on and off enables the solenoid valve 100 of the embodiment to function as an electromagnetic pump that pressure feeds operation oil. The detailed description of the solenoid valve 100 is hereby concluded.

The switching valve 50, as FIG. 4 shows, is formed from a sleeve 52, a spool 54 that slides in the axial direction inside the sleeve 52, and a spring 56 that biases the spool 54 in the axial direction. The sleeve 52 is formed with various ports: a signal pressure input port 52a that is input with the line pressure PL as a signal pressure; an input port 52b that is connected to an oil passage 46 between the strainer 41 and the mechanical oil pump 42; an output port 52c that is connected to the intake port 132a of the pump portion 130 of the solenoid valve 100; a drain port 52d; an input port 52e that is connected to the output port 122b of the pressure regulating valve portion 120 of the solenoid valve 100; an output port 52f that is connected to the oil passage 48 of the clutch C1; a drain port 52g that is connected to a drain oil passage 91; an input port 52h that is connected to the drain port 132c of the pump portion 130; and a drain port 52i. When the line pressure PL is input to the signal pressure input port 52a of the switching valve 50, the spool 54 overcomes the biasing force of the spring 56 to move to the position shown on the right-hand side of the valve in the figure such that the input port 52e communicates with the output port 52f and the drain port 52g is closed. Thus, the output port 122b of the pressure regulating valve portion 120 communicates with the oil passage 48 of the clutch C1, and the drain oil passage 91 is cut off. When the line pressure PL is not input to the signal pressure input port 52a, the biasing force of the spring 56 causes the spool 54 to move to the position shown on the left-hand side of the valve in the figure. Consequently, the input port 52b communicates with the output port 52c such that the intake port 132a of the pump portion 130 is connected to the oil passage 46 between the strainer 41 and the mechanical oil pump 42 through the switching valve 50. In addition, the input port 52e is closed and the output port 52f communicates with the drain port 52g such that the oil passage 48 of the clutch C1 communicates with the drain oil passage 91. Note that when the line pressure PL is input to the signal pressure input port 52a, the input port 52b is closed, the output port 52c communicates with the drain port 52d so that operation oil is not delivered to the intake port 132a of the pump portion 130, and the output port 52h communicates with the drain port 52i to drain operation oil from the drain port 132c of the pump portion 130.

The manual valve 90, as FIG. 4 shows, is formed with an input port 92a, a D-position output port 92b, and an R-position output port 92c that communicate with a generally cylindrical space formed inside the valve body. The manual valve 90 opens and closes each port by sliding a spool 94 provided with two lands 94a, 94b inside the space in association with the shift operation of the shift lever 71. In other words, when a shift is made to the D position, the space between the two lands 94a, 94b of the spool 94 communicates the input port 92a with the D-position output port 92b and the land 94a cuts off communication between the input port 92a and the R-position output port 92c. When a shift is made to the N position, the land 94b cuts off communication between the input port 92a and the D-position output port 92b, and the land 94a cuts off communication between the input port 92a and the R-position output port 92c. When a shift is made to the R position, the space between the two lands 94a, 94b of the spool 94 communicates the input port 92a with the R-position output port 92c, and the land 94b cuts off communication between the input port 92a and the D-position output port 92b.

Figure 6A:
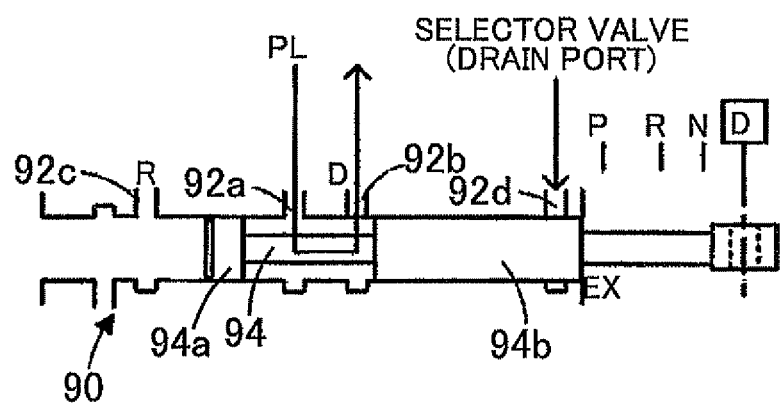
FIGS. 6A and 6B are explanatory drawings that show the operation of a manual valve 90 while a shift lever 71 is in the D position, and the operation of the manual valve 90 while the shift lever 71 is in the N position.
Figure 6B:
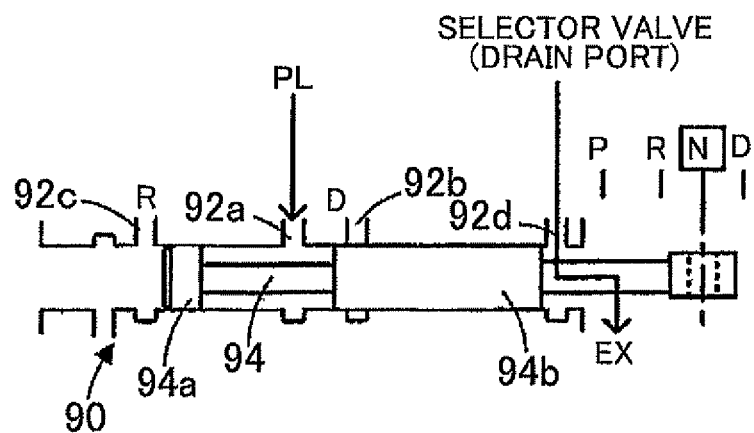

The valve body of the manual valve 90 is also formed with a drain input port 92d that is connected to the drain oil passage 91, in addition to the input port 92a and the output ports 92b, 92c. The drain input port 92d is separated from the input port 92a and the output ports 92b, 92c by the land 94b. FIGS. 6A and 6B show the operation of the manual valve 90 while the shift lever 71 is in the D position, and the operation of the manual valve 90 while the shift lever 71 is in the N position. In the manual valve 90, when a shift is made to the D position, the drain input port 92d is closed by the outer wall of the land 94b (see FIG. 6A). When a shift is made to the N position, the land 94b moves toward the left side in the figure to open the drain input port 92d and operation oil in the drain oil passage 91 is input through the drain input port 92d and drained from the side of the land 94b opposite the land 94a (see FIG. 6B).

Furthermore, when the automobile 10 of the embodiment thus formed is running with the shift lever 71 in the Drive (D) driving position, the engine 12 automatically stops when all preset automatic stop conditions are satisfied. Such automatic stop conditions include the vehicle speed V being zero, the accelerator off, and the brake switch signal BSW on. Once the engine 12 automatically stops, if preset automatic start conditions such as the brake switch signal BSW being off are subsequently satisfied, the automatically stopped engine 12 is automatically started.

When the automatic stop conditions are satisfied in the automobile 10 of the embodiment and the engine 12 automatically stops, the mechanical oil pump 42 also stops accordingly. Therefore, the line pressure PL escapes and the spool 54 of the switching valve 50 cuts the communication between the output port 122b of the pressure regulating valve portion 120 of the solenoid valve 100 and the oil passage 48 of the clutch C1, and communicates the oil passage 48 of the clutch C1 with the drain oil passage 91. When the shift lever 71 is in the D position, the drain input port 92d of the manual valve 90 connected to the drain oil passage 91 is closed. Therefore, the solenoid valve 100 can function as an electromagnetic pump and cause hydraulic pressure to act on the clutch C1. When the automatic start conditions are subsequently satisfied and the engine 12 automatically starts, the mechanical oil pump 42 also operates accordingly. Therefore, the line pressure PL is delivered and the spool 54 of the switching valve 50 communicates the output port 122b of the pressure regulating valve portion 120 with the oil passage 48 of the clutch C1, and cuts off communication between the oil passage 48 and the drain oil passage 91. In such case, the line pressure PL input through the D-position output port 92b of the manual valve 90 is regulated by the solenoid valve 100 functioning as a pressure regulating valve and supplied to the clutch C1, such that the clutch C1 becomes completely engaged and starts the vehicle moving. By making the solenoid valve 100 function as an electromagnetic pump so that hydraulic pressure acts on the clutch C1 while the engine 12 is automatically stopped, the clutch C1 can be rapidly engaged immediately after the engine 12 automatically restarts. Therefore, the vehicle can smoothly start off. Note that in this embodiment, the solenoid valve 100 is designed with a pressure feeding performance as an electromagnetic pump capable of replenishing only an amount of operation oil from the pump portion 130 that leaked from a seal ring or the like provided between the piston and drum of the clutch C1.

The penetration or the like of foreign matter while the shift lever 71 is in the D position and the engine 12 is automatically stopped may lead to a situation where the spool 54 of the switching valve 50 is stuck (locked) in the position shown on the left-hand side of the valve in FIG. 4. In this situation, even if the automatic start conditions of the engine 12 are subsequently satisfied and the line pressure PL acts on the signal pressure input port 52a of the switching valve 50, the spool 54 does not move. Therefore, communication between the output port 122b of the pressure regulating valve portion 120 of the solenoid valve 100 and the oil passage 48 of the clutch C1 remains cut off, and the oil passage 48 remains in communication with the drain oil passage 91. The drain input port 92d connected to the drain oil passage 91 is closed when the shift lever 71 is in the D position. Therefore, residual pressure acts on the clutch C1. In such case, operating the shift lever 71 from the D position to the N position opens the drain input port 92d of the manual valve 90, and residual pressure acting on the clutch C1 is drained through the output port 52f and the drain port 52g of the switching valve 50, the drain oil passage 91, and the drain input port 92d of the manual valve 90 in that order. Thus, even if the switching valve 50 sticks, when the shift lever 71 is operated to the N position, draining of the residual pressure of the clutch C1 prevents the transmission of power from the engine 12 to the drive shaft 82. The drain oil passage 91 connects the switching valve 50 and the manual valve 90 for this reason.

According to the power transmission device 20 of the embodiment described above, the manual valve 90 is formed with a drain input port 92d that closes if a shift is made to the D position and opens for draining if a shift is made to the N position. The switching valve 50 is formed such that, when the line pressure PL acts on the signal pressure input port 52a during operation of the engine 12, the output port 122b of the pressure regulating valve portion 120 communicates with the oil passage 48 of the clutch and the drain port 52g is closed, and when the line pressure PL does not act on the signal pressure input port 52a during an automatic stop of the engine 12, communication between the output port 122b of the pressure regulating valve portion 120 and the oil passage 48 of the clutch is cut off and the oil passage 48 communicates with the drain port 52g. Furthermore, the drain input port 92d of the manual valve 90 and the drain port 52g of the switching valve 50 are connected by the drain oil passage 91. Therefore, the hydraulic pressure of the clutch C1 can be drained through the switching valve 50, the drain oil passage 91, and the drain input port 92d of the manual valve 90. Therefore, even if the switching valve 50 sticks in a state that closes the oil passage 48 of the clutch C1 due to the penetration of foreign matter or the like during an automatic stop of the engine 12, when the engine 12 subsequently restarts and a shift is made to the N position, draining of the residual pressure of the clutch C1 can suppress the transmission of power from the engine 12 to the drive shaft 82. Consequently, it is possible to suppress a transmission of power unexpected by the driver while in the N position.

In the power transmission device 20 of the embodiment, the oil passage 48 of the clutch C1 and the drain oil passage 91 are connected through the switching valve 50 (output port 52f, drain port 52g). However, the oil passage 48 of the clutch C1 and the drain oil passage 91 may be directly connected.

In the power transmission device 20 of the embodiment, the solenoid valve 100 is integrally constituted so as to function as both a linear solenoid and an electromagnetic pump.

Figure 7:
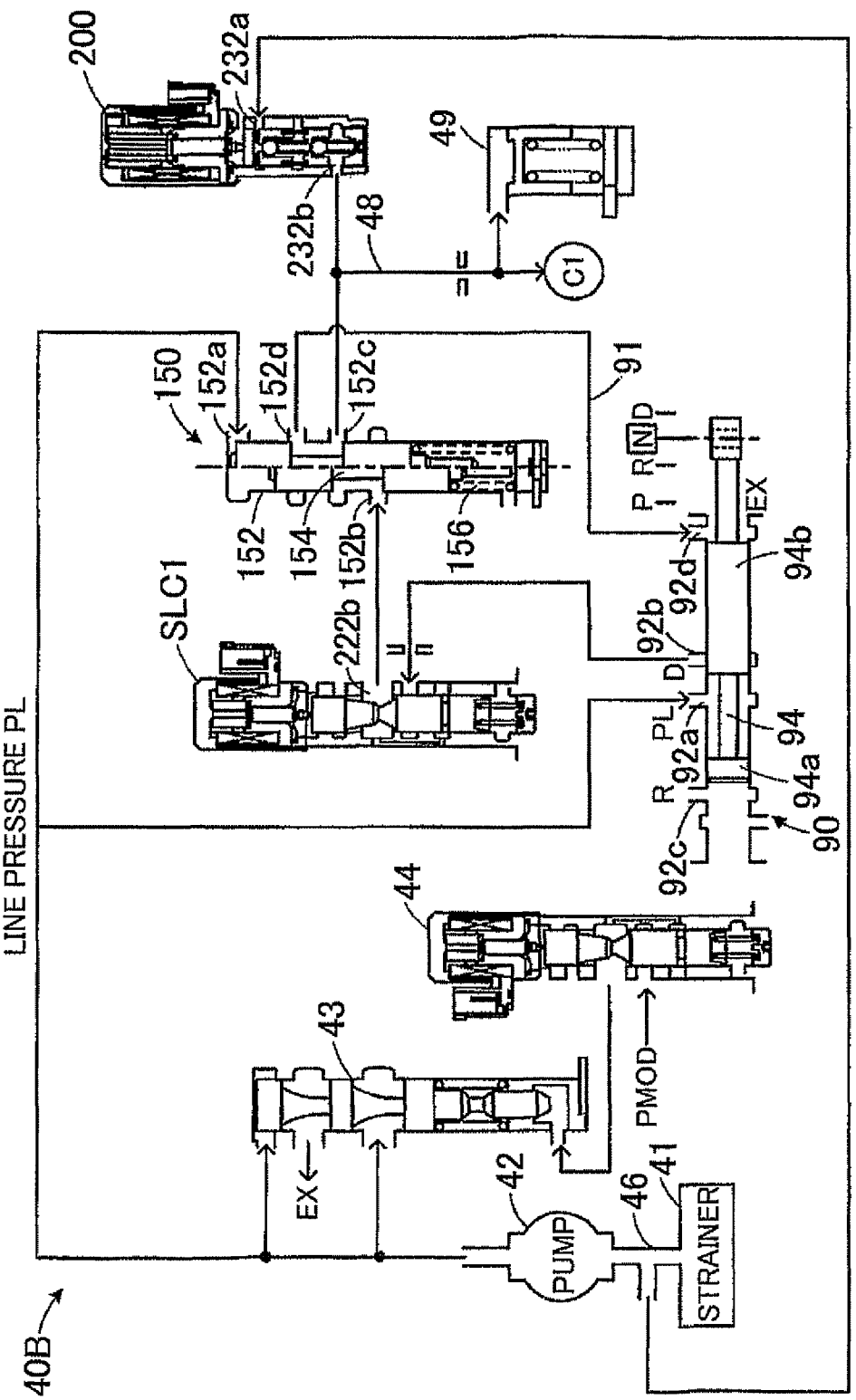
FIG. 7 is a structural diagram that shows an outline of the constitution of a hydraulic circuit 40B according to a modification.

However, the linear solenoid and the electromagnetic pump may be formed as separate bodies. FIG. 7 is a structural diagram that shows an outline of the constitution of a hydraulic circuit 40B according to a modification. Like reference numerals are used for like structures of the hydraulic circuit 40 and the hydraulic circuit 40B in FIG. 7, and overlapping descriptions are omitted here. As shown in the figure, instead of the solenoid valve 100 and the switching valve 50, the hydraulic circuit 40B of the modification includes a linear solenoid SLC1, an electromagnetic pump 200, and a switching valve 150. The normally closed linear solenoid SLC1 is input with the line pressure PL from the D-position output port 92b of the manual valve 90, regulates the pressure of operation fluid by discharge, and outputs the operation fluid. The electromagnetic pump 200 is formed with an intake port 232a that is connected to the oil passage 46 between the mechanical oil pump 42 and the strainer 41, and a discharge port 232b that is connected to the oil passage 48 of the clutch C1. The electromagnetic pump 200 intakes operation oil from the intake port 232a and discharges from the discharge port 232b. The switching valve 150 switches between communicating and cutting off communication between an output port 222b of the linear solenoid SLC1 and the oil passage 48 of the clutch C1, and between the oil passage 48 and the drain oil passage 91. Note that although the linear solenoid SLC1 is constituted as a normally closed type, the linear solenoid SLC1 may obviously be a normally open type instead.

The switching valve 150 is formed from a sleeve 152, a spool 154 that slides in the axial direction inside the sleeve 152, and a spring 156 that biases the spool 154 in the axial direction. The sleeve 152 is formed with a signal pressure input port 152a that is input with the line pressure PL as a signal pressure; an input port 152b that is connected to the output port 222b of the linear solenoid SLC1; an output port 152c that is connected to the discharge port 232b of the electromagnetic pump 200 and the oil passage 48 of the clutch C1; and a drain port 152d that is connected to the drain oil passage 91. When the line pressure PL is input to the signal pressure input port 152a of the switching valve 150, the spool 154 overcomes the biasing force of the spring 156 to move to the position shown on the left-hand side of the valve in the figure. Consequently, the input port 152b communicates with the output port 152c, the output port 222b of the linear solenoid SLC1 communicates with the oil passage 48 of the clutch C1, communication between the output port 152c and the drain port 152d is cut off, and communication between the oil passage 48 of the clutch C1 and the drain oil passage 91 is cut off. When the line pressure PL is not input to the signal pressure input port 152a, the biasing force of the spring 156 causes the spool 154 to move to the position shown on the right-hand side of the valve in the figure. Consequently, the input port 152b is closed, communication between the output port 222b of the linear solenoid SLC1 and the oil passage 48 of the clutch C1 is cut off, the output port 152c communicates with the drain port 152d, and the oil passage 48 of the clutch C1 communicates with the drain oil passage 91. Similar to the embodiment, in the hydraulic circuit 40B of the modification, the manual valve 90 is formed with the drain input port 92d that is connected to the drain oil passage 91. Hydraulic pressure of the clutch C1 can thus be drained through the switching valve 150 (the output port 152c and the drain port 152d), the drain oil passage 91, and the drain input port 92d of the manual valve 90. Therefore, similar to the embodiment, even if the switching valve 150 sticks in a state that closes the oil passage 48 of the clutch C1 due to the penetration of foreign matter or the like during an automatic stop of the engine 12, when the engine 12 subsequently restarts and a shift is made to the N position, draining of the residual pressure of the clutch C1 can suppress the transmission of power from the engine 12 to the drive shaft 82.

In the power transmission device 20 of the embodiment, the discharge port 132b of the pump portion 130 and the oil passage 48 of the clutch C1 are directly connected. However, the discharge port 132b and the oil passage 48 of the clutch C1 may be connected through the switching valve 50. In such case, the switching valve 50 may be formed so as to cut off communication between the discharge port 132b and the oil passage 48 of the clutch C1 when the line pressure PL is applied during operation of the engine 12, and communicate the discharge port 132b with the oil passage 48 of the clutch C1 when the line pressure PL is not applied during an automatic stop of the engine 12.

In the power transmission device 20 of the embodiment, the switching valve 50 is driven using the line pressure PL. However, the switching valve 50 may be driven using the modulator pressure PMOD achieved by lowering the line pressure PL with a modulator valve (not shown). Alternatively, the line pressure PL or the modulator pressure PMOD may be supplied to the switching valve 50 through a solenoid valve, and the solenoid valve used to drive the switching valve 50.

In the power transmission device 20 of the embodiment, the solenoid valve 100 functioning as a pressure-regulating valve is constituted as a pressure-regulating valve for direct control that directly controls the clutch C1 by generating an optimal clutch pressure from the line pressure PL. However, a pressure-regulating valve for pilot control may be used to drive a separate control valve and the control valve may generate a clutch pressure to control the clutch C1.

In the power transmission device 20 of the embodiment, the intake check valve 134 and the discharge check valve 136 are built into the sleeve 122. However, either one may be incorporated into any part of the valve body 102 besides the sleeve 122, or both may be incorporated into the valve body 102.

Here, the correspondence relation will be described between main elements in the embodiment and main elements of the invention as listed in the Summary of the Invention. In the embodiment, the engine 12 corresponds to a "motor"; the automatic transmission 30, the hydraulic circuit 40, and the like to a "power transmission device"; the mechanical oil pump 42 to a "mechanical pump"; the solenoid portion 110 and the pump portion 130 of the solenoid valve 100 and the electromagnetic pump 200 to an "electromagnetic pump"; the manual valve 90 to a "shift valve"; and the switching valve 50 to a "switching valve". The solenoid portion 110 and the pressure regulating valve portion 120 of the solenoid valve 100 correspond to a "pressure regulating valve". Here, the motor is not limited to an internal combustion engine that outputs power using a hydrocarbon fuel such as gasoline or diesel. The motor may be any type of internal combustion engine, such as a hydrogen engine, or any type of motor capable of power output, such as an electric motor other than an internal combustion engine. The power transmission device incorporates the five-speed automatic transmission 30 with first to fifth forward speeds. However, the present invention is not limited to this example, and the power transmission device may incorporate an automatic transmission with any number of speeds, such as a four-speed, six-speed, or eight-speed automatic transmission. The power transmission device is also not limited to one that incorporates an automatic transmission. The power transmission device may take on any form provided that it has a clutch and can connect and disconnect an output shaft of the motor and an axle by switching an engagement state of the clutch, wherein the power transmission is directly connected to the crankshaft 14 of the engine 12 through the clutch and connected to the wheels 86*a*, 86*b* through the differential gear 84. The electromagnetic pump is not limited to an electromagnetic pump that pressure feeds operation oil using electromagnetic force from the solenoid portion 110. The electromagnetic pump may be any type of pump that is driven by power to generate fluid pressure, such as an electric pump that pressure feeds operation oil using power from an electric motor. In addition, the electromagnetic pump is not limited to one that pressure feeds operation fluid to the clutch C1 which forms the first forward speed. For example, when a shift speed other than the first forward speed (such as the second forward speed) is set at start-off based on a driver instruction or the running condition, the electromagnetic pump may pressure feed operation oil to a clutch or brake that forms this speed. The pressure regulating valve is not limited to a normally closed solenoid valve, and may be constituted as a normally open solenoid valve. Note that with regard to the correspondence relation between the main elements of the embodiment and the main elements of the invention as listed in the Summary of the Invention, the embodiment is only an example for giving a specific description of a best mode for carrying out the invention explained in the Summary of the Invention. This correspondence relation does not limit the elements of the invention as described in the Summary of the Invention. In other words, any interpretation of the invention described in the Summary of the Invention shall be based on the description therein; the embodiment is merely one specific example of the invention described in the Summary of the Invention.

The above embodiment was used to describe a best mode for carrying out the present invention. However, the present invention is not particularly limited to such an example, and may obviously be carried out using various embodiments without departing from the scope of the present invention.

The present invention may be used in the automobile industry and the like.

The invention claimed is:

1. A power transmission device installed in a vehicle, comprising:
   a friction engagement element that transmits power from a motor to an axle;
   a mechanical pump that is driven by power from the motor and generates fluid pressure;
   a switching valve that is connected to a supply path connected to a fluid pressure servo of the friction engagement element, and switches between opening and closing the supply path;
   a shift valve that outputs fluid pressure generated by the mechanical pump to the supply path when a shift is made to a driving position, and drains operation fluid in the fluid pressure servo when a shift is made to a neutral position when the switching valve is in a state that closes the supply path; and
   an electric pump that is driven by electric power, and generates and supplies fluid pressure to the fluid pressure servo when the switching valve closes the supply path.

2. The power transmission device according to claim 1, wherein
   the shift valve comprises:
      an input port;
      a plurality of output ports including a driving position output port; and
      a drain input port that is connected to a drain passage connected to the fluid pressure servo and is input with the operation fluid from the drain passage, wherein
      when a shift is made to the driving position, fluid pressure generated by the mechanical pump is input from the input port and output from the driving position output port and the drain input port is closed, and
      when a shift is made to the neutral position, communication between the input port and the driving position output port is cut off and the drain input port is opened to drain the operation fluid.

3. The power transmission device according to claim 2, wherein
   the switching valve switches between a first connection state, wherein when fluid pressure is input from the mechanical pump, the supply path is opened to connect the fluid pressure servo and the driving position output port, and a second connection state wherein, when fluid pressure is not input from the mechanical pump, the supply path is closed to cut off the connection between the fluid pressure servo and the driving position output port.

4. The power transmission device according to claim 2, wherein
   the drain passage is connected to the fluid pressure servo through the switching valve, and
   the switching valve comprises:
      a signal pressure port that is connected to a flow passage from the mechanical pump;
      an input port that is connected to a flow passage from the driving position output port;
      an output port that is connected to a flow passage from the fluid pressure servo; and
      a drain port that is connected to the drain passage, wherein
         the switching valve communicates the input port of the switching valve with the output port and closes the drain port when fluid pressure acts on the signal pressure port, and closes the input port of the switching valve and communicates the output port with the drain port when fluid pressure does not act on the signal pressure port.

5. The power transmission device according to claim 2, wherein
   the electric pump is an electromagnetic pump, and
   the electric pump comprises:
      a pressure regulating valve that is input with and regulates fluid pressure from the driving position output port and supplies the fluid pressure to the fluid pressure servo through the switching valve, wherein
   the pressure regulating valve and the electromagnetic pump are integrated in a solenoid valve, and
   the solenoid valve comprises:
      a hollow sleeve that has a first port group that includes an input port, an output port, and a drain port, and a second port group that includes an intake port and a discharge port;
      a spool that is a shaft accommodated in the sleeve, and opens and closes the respective ports by sliding in the axial direction;
      a spring that biases the spool in the axial direction;
      a solenoid portion that generates thrust acting on the spool in a direction that opposes the spring;
      a pressure regulating chamber formed between the sleeve and the spool so as to function as the pressure regulating valve that, by adjusting the thrust generated by the solenoid portion, regulates a pressure of operation fluid input through the input port by discharge from the drain port, and outputs the operation fluid from the output port; and a pump chamber that is defined as a space between the sleeve and the spool and is separated from the pressure regulating chamber so as to function as the electromagnetic pump that, by repeated generation and cancellation of the thrust from the solenoid portion, intakes operation fluid through the intake port and discharges operation fluid from the discharge port.

6. The power transmission device according to claim 1, wherein the motor is an internal combustion engine that automatically stops and automatically starts.

7. A vehicle comprising:

a motor; and the power transmission device according to claim 1.

* * * * *